(12) United States Patent
Webber et al.

(10) Patent No.: US 9,672,266 B2
(45) Date of Patent: Jun. 6, 2017

(54) METHOD AND APPARATUS FOR ENSURING CONSISTENT OUTCOMES IN UPDATES TO DISTRIBUTED DATABASES

(71) Applicants: James Webber, London (GB); Ian S. Robinson, London (GB); Mats Tobias Lindaaker, Malmo (SE); Alistair Philip Campbell Jones, London (GB)

(72) Inventors: James Webber, London (GB); Ian S. Robinson, London (GB); Mats Tobias Lindaaker, Malmo (SE); Alistair Philip Campbell Jones, London (GB)

(73) Assignee: Neo Technology, Inc., San Mateo, CA (US)

( * ) Notice: Subject to any disclaimer, the term of this patent is extended or adjusted under 35 U.S.C. 154(b) by 0 days.

(21) Appl. No.: 14/213,508

(22) Filed: Mar. 14, 2014

(65) Prior Publication Data

US 2014/0289197 A1 Sep. 25, 2014

Related U.S. Application Data

(60) Provisional application No. 61/801,753, filed on Mar. 15, 2013.

(51) Int. Cl.
*G06F 17/30* (2006.01)
(52) U.S. Cl.
CPC ............... *G06F 17/30581* (2013.01)
(58) Field of Classification Search
CPC .............. G06F 17/30575; G06F 17/30581
USPC ................. 707/610, 632–635, 703
See application file for complete search history.

(56) References Cited

U.S. PATENT DOCUMENTS

| 6,823,355 | B1 | 11/2004 | Novaes et al. |
| 7,653,668 | B1 | 1/2010 | Shelat et al. |
| 7,979,652 | B1* | 7/2011 | Sivasubramanian ............. G06F 11/2094 711/141 |
| 8,443,062 | B2* | 5/2013 | Voutilainen ....... G06F 17/30575 709/221 |
| 2004/0230624 | A1* | 11/2004 | Frolund .............. G06F 11/1662 707/999.204 |

(Continued)

OTHER PUBLICATIONS

European Patent Office, Search Report and Written Opinion of the International Searching Authority, PCT/IB2014/001294, mailed on Nov. 13, 2014.

(Continued)

*Primary Examiner* — Hares Jami
(74) *Attorney, Agent, or Firm* — Innovation Counsel LLP

(57) ABSTRACT

Methods of conducting database transactions. One such method comprises receiving data to be written to a database; identifying a set of shard replicas corresponding to the database to which the data is to be written; transmitting, to each of the replicas in the set, a request to write the data thereto; receiving votes back from the replicas in the set, each vote representing whether the respective replica commits to a writing of the data thereto; determining whether to commit to the writing of the data to the database according to whether a majority of the replicas of every shard having replicas in the set has transmitted a vote committing to the writing of the data thereto; and transmitting an outcome of the determining to each of the replicas in the set.

14 Claims, 5 Drawing Sheets

(56) References Cited

U.S. PATENT DOCUMENTS

| | | | | |
|---|---|---|---|---|
| 2013/0110774 A1* | 5/2013 | Shah | ............... | G06F 11/1474 |
| | | | | 707/610 |
| 2013/0110781 A1* | 5/2013 | Golab | ............... | G06F 17/30581 |
| | | | | 707/638 |
| 2013/0290249 A1* | 10/2013 | Merriman | ......... | G06F 17/30584 |
| | | | | 707/610 |
| 2014/0040898 A1* | 2/2014 | Karp | ..................... | G06F 9/466 |
| | | | | 718/101 |

OTHER PUBLICATIONS

Gifford, "Weighted Voting for Replicated Data", Stanford University and Xerox Palo Alto Research Center, pp. 150-162, Dec. 31, 1979.

Lamport, "The Part-Time Parliament", ACM Transactions on Computer Systems, vol. 16, No. 2, pp. 133-169, May 1, 1998.

Anonymous: "Two-phase commit protocol—Wikipedia", Mar. 2, 2013, XP055316857, Retrieved from the Internet: URL:https://en.wikipedia.org/w/index.php?title=Two-phase_commit_protocol&oldid=541733097, retrieved on Nov. 7, 2016.

* cited by examiner (1)

METHOD AND APPARATUS FOR ENSURING CONSISTENT OUTCOMES IN UPDATES TO DISTRIBUTED DATABASES

This application claims priority to, and the benefit of, U.S. Provisional Patent Application Ser. No. 61/801,753, filed Mar. 15, 2013, the entire disclosure of which is incorporated herein by reference.

BRIEF DESCRIPTION

Embodiments of the invention relate generally to databases. More specifically, embodiments of the invention relate to ensuring consistent outcomes in updates to distributed databases.

BACKGROUND

Database management systems use transactions to do work in a dependable manner. A transaction is a unit of work—a coordinated sequence of operations—that allows applications to reliably update the state of the system independently of any other operations that may be taking place at the same time.

Distributed systems (such as database clusters), which are physically distributed across several machines, use distributed transactions to update the state of the overall system. Distributed transactions involve multiple participants, which comprise the distributed parts of the system responsible for persisting changes to data. For a distributed transaction to succeed, the participants must achieve consensus about its outcome.

To date, distributed transactions have tended to use a strict two-phase commit approach, which requires that all the parts of the system containing the state to be updated participate in the transaction and agree on its outcome. Strict two-phase commit ensures write-consistent behavior and avoids corrupting data, but at the expense of liveness. Liveness in a distributed system is a measure of the system's ability to complete transactions, whether successfully or unsuccessfully. Strict two-phase commit approaches reduce a system's liveness because of the overhead of coordinating all the participants in the transaction, thereby limiting the system's scalability and practicality. In consequence, database clusters that use strict two-phase commit approaches tend to be relatively small—on the order of single digit machines.

To date, methods also exist for carrying out distributed transactions in such a way that preserves liveness at the expense of the integrity of the data. Such methods are termed to be "eventually consistent", and generally speaking do not ensure consistency at write time. The significant disadvantage of such methods is that machines not participating in the update are liable to diverge, and over time, in a live system, end up with corrupt data. This is particularly true in cases where the data is connected rather than simply stored as discrete keys and values.

SUMMARY

Various embodiments of the invention can be implemented as a method and as computer readable memories. In one embodiment, a method of updating a database comprises receiving data to be written to a database; identifying a set of shard replicas corresponding to the database to which the data is to be written; transmitting, to each of the replicas in the set, a request to write the data thereto; receiving votes back from the replicas in the set, each vote representing whether the respective replica commits to a writing of the data thereto; determining whether to commit to the writing of the data to the database according to whether a majority of the replicas of every shard having replicas in the set has transmitted a vote committing to the writing of the data thereto; and transmitting an outcome of the determining to each of the replicas in the set.

The transmitting an outcome can further comprise transmitting a commit instruction to each of the replicas in the set upon receiving the vote committing to the writing of the data from a majority of the replicas of every shard having replicas in the set.

The transmitting an outcome can further comprise transmitting a cancel instruction to each of the replicas in the set upon receiving votes committing to the writing of the data from less than half of the replicas of a shard having replicas in the set after a predetermined time period.

The transmitting, to each of the replicas in the set, a request to write the data thereto can further comprise transmitting at least a portion of the data that is to be written.

In another embodiment, a method of updating a database comprises transmitting a request to execute a database transaction, the request transmitted to a set of database members, the set being a set of shard replicas; receiving responses from the members of the set, each response representing whether the corresponding member commits to the transaction; and committing to the transaction if, for every shard having replicas in the set, a majority of its respective replicas has committed to the transaction.

The method may further comprise cancelling the transaction if, for at least one shard having replicas in the set, only a minority of its respective replicas has transmitted a response representing commitment to the transaction after a predetermined time period.

The transmitting a request can further comprise transmitting data to be written to the database in the transaction.

Embodiments of the invention can also include one or more non-transitory computer-readable media, the media collectively storing instructions for executing a method of updating at least one database shard or replica thereof, where the method comprises any of the above described methods and/or variants thereof.

BRIEF DESCRIPTION OF THE DRAWINGS

For a better understanding of the invention, reference should be made to the following detailed description taken in conjunction with the accompanying drawings, in which.

DETAILED DESCRIPTION

Figure 1:
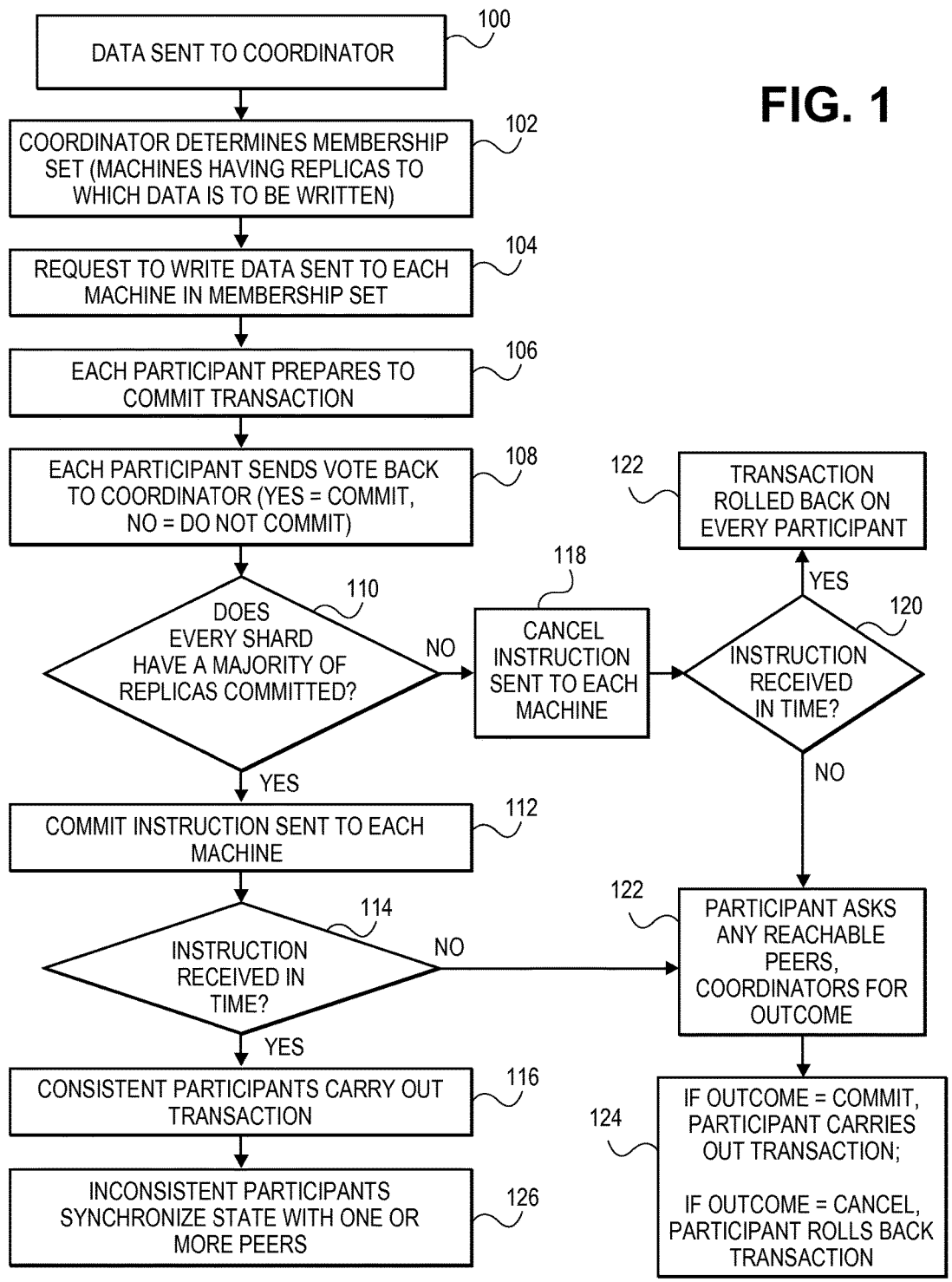
FIG. 1 is a flowchart of an exemplary process consistent with an embodiment of the present invention.

Embodiments of the invention provide for more effective updating of distributed database systems. In particular, in distributed database systems having multiple shards and redundant replicas of each shard (shards being logical constructs materialized through one or more replicas), an exemplary process involves transmitting a request to write data to each one of a pre-specified set of shard replicas (collectively, each "participant"). This request serves both to enroll each participant in the transaction (i.e., the writing of data), and to request a vote from each participant. A decision is made whether to commit the transaction or not, according to the votes. To commit, a majority of replicas from every shard must indicate their willingness to commit. If commitment is achieved, committed participants then carry out the transaction. Participants that have not committed discover they are inconsistent with respect to the transaction outcome. Inconsistent participants will subsequently synchronize with their peers to return to a consistent state, using a synchronization protocol. If no commitment is achieved, the transaction is rolled back on every participant. If participants have not received instructions (commit/no commit) within a specified time (which can be any amount of time), individual participants ask any reachable peers or coordinators for the outcome, and carry out/roll back the transaction accordingly.

Aspects of the invention overcome the limitations of both the above-described conventional methods, and achieve a combination of reliability and scalability that is not available using any conventional method. This is accomplished through a specialized two-phase protocol that operates across a subset of cluster members, ensuring consistency at write time while allowing for favorable scalability characteristics.

Such a process and its various embodiments differ from other two-phase commit protocols in at least three respects. First, an assumption is made that any transaction protocol is used for updating data for which there are redundant replicas, not arbitrary distributed computation or business activities.

Second, the membership set for a general-purpose protocol is open ended when the transaction is initiated and participants enroll in the transaction as it progresses. In contrast, embodiments of the invention employ a transaction protocol in which a coordinator determines the membership set in full when the transaction is initiated.

Third, strict general-purpose transaction protocols require that all participants agree on a positive outcome for the transaction; otherwise it is rolled back. In contrast, in embodiments of the invention, to determine a consistent outcome only a majority of participants need agree on the outcome. Combining the ability to identify all participants at the outset of a transaction with the requirement that only a majority of participants agree on the outcome, serves to increase the liveness of the system, which in turn increases its scalability.

Embodiments of the invention employ a set of protocols that coordinate the interactions between participants in a transaction in such a way that only a majority have to agree for the transaction to succeed. In contrast, strict two-phase commit approaches employ all-or-nothing semantics: everyone must agree on a successful outcome for the transaction to succeed, otherwise it fails. Because the strict two-phase commit approach requires everyone to agree, it can suffer from cases of pathological latency, in which the outcome is dependent on a last, straggling participant. Embodiments of the invention require only a majority of participants for commitment, and thus reduce or eliminate the uncertainty that prevails in the pathological case of a highly-latent, strict two-phase commit.

Embodiments of the invention make several assumptions regarding the distribution and structure of the data in a database. Regarding distribution, it assumes that the system distributes or partitions data across database servers in a way that ensures that every item of data is multiply redundant—that is, there are copies of every data item on multiple machines—while also ensuring no individual server has all of the data (because that would be operationally inefficient). The unit of partition is referred to herein as a shard. In partitioning the data, the system assigns some portion of the data to one shard, another portion to a different shard, and so on. Each shard is stored as a number of physical replicas. That is, the system replicates the data assigned to a shard to multiple machines. Each machine holds replicas of one or more shards.

Any number of connections may exist between records located within a single shard, and between records located in different shards.

When a transaction involves only a single shard, a majority of the shard's replicas must vote to commit the transaction for the system to determine it is successful. Because the contents of a shard are replicated to multiple machines, a majority of the machines hosting replicas of the shard must respond with a commit message related to that shard.

In the general case, a transaction can involve multiple shards. Such transactions can only be considered successful when every shard involved in the write furnishes a majority of replicas that agree to commit the transaction. Each individual shard still requires only a majority of replicas to vote commit; however, the success of the overall transaction requires that every shard involved in the transaction achieve a majority. If one or more shards fail to achieve majority, the transaction fails, and its changes are not made durable on any of the replicas belonging to any of the shards.

FIGS. 1-6 illustrate the progress of a distributed transaction in one embodiment of the present invention. FIG. 1 is a flowchart describing one such exemplary distributed transaction. A data set that is to be written to a distributed database is first sent to one of the database's coordinator programs, such as by an application program (Step 100). The coordinator then determines the membership set for this data, i.e. the replicas of each shard to which the data are to be written (Step 102). Membership can be determined in any manner. For example, a mapping of each shard to its associated computer(s) can be maintained, as well as a mapping of data to each shard. These mappings collectively indicate which shards should be involved in the writing of any particular data set. The mappings can be created and maintained in any manner, such as by known techniques like consistent hashing.

Figure 2:
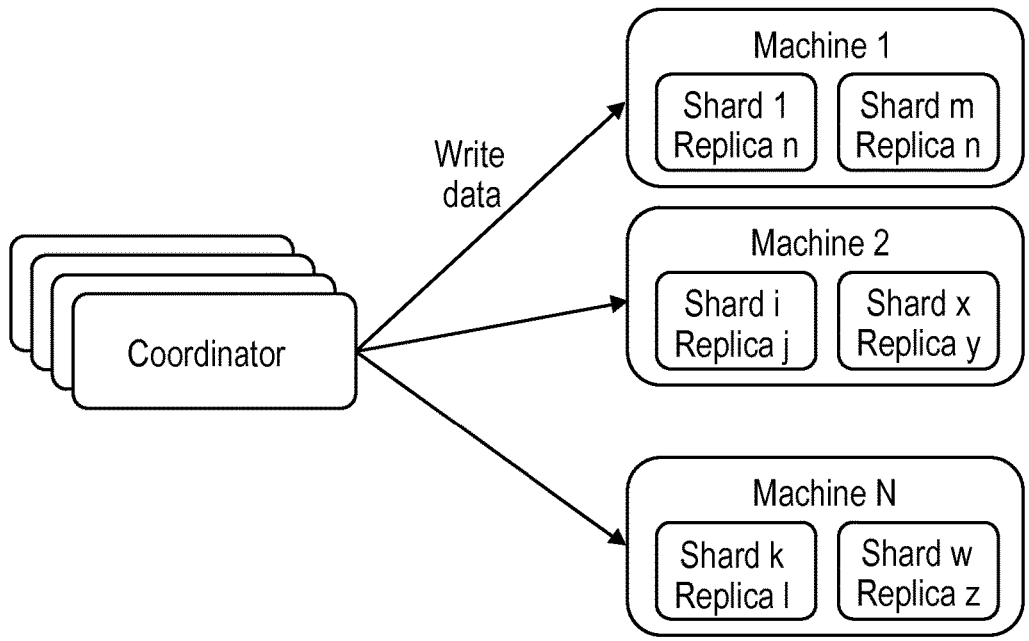
FIG. 2 is a block diagram illustrating further details of a portion of the process of FIG. 1.

A request to write the data set is sent to each machine having a shard replica in the membership set (Step 104). FIG. 2 shows further details of Step 104. More specifically, FIG. 2 shows the composition of a distributed database cluster. Data is partitioned across logical shards; each shard is replicated across multiple machines. The system includes one or more coordinators, which manage the transaction protocol and coordinate the interactions between participants to achieve consensus. When an application wants to write data to the database, it contacts a coordinator (either directly or indirectly) and sends it the data to be written to the system. The coordinator thereafter manages the transaction on the application's behalf. It determines the membership set for the transaction, and then sends the data to each participant in the membership set.

Conventional transaction protocols require that participants enroll in a transaction before undertaking any other actions. Once a participant has been enrolled, the protocol will request that it vote on the outcome. With other transaction protocols, the acts of enrolling participants and then requesting they vote are usually achieved with separate messages. In contrast, in aspects of the invention, the act of sending data from a coordinator to a predetermined membership set serves implicitly both to enroll each participant in the transaction, and request that each participant vote on the outcome.

The transaction protocol uses far fewer messages to begin a transaction than other distributed transaction protocols because the membership set is computed by the coordinator, thereby eliminating the need for participants to register with a transaction manager, and because each request to write data simultaneously enrolls a participant, instructs it which data to make durable, and requests that it vote on the outcome of the transaction.

Figure 3:
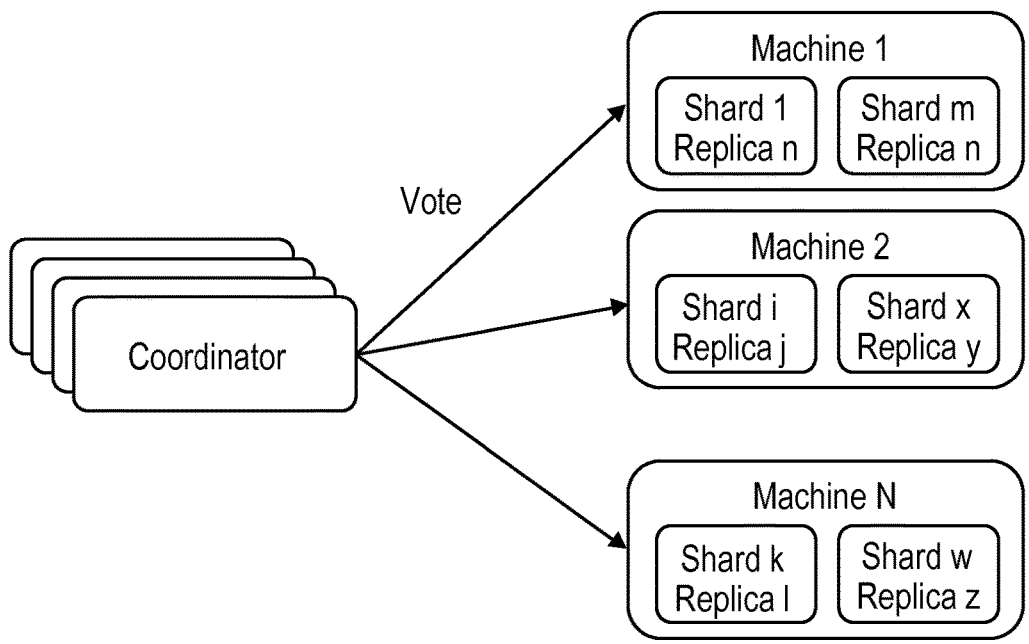
FIG. 3 is a block diagram illustrating further details of another portion of the process of FIG. 1.
Figure 4:
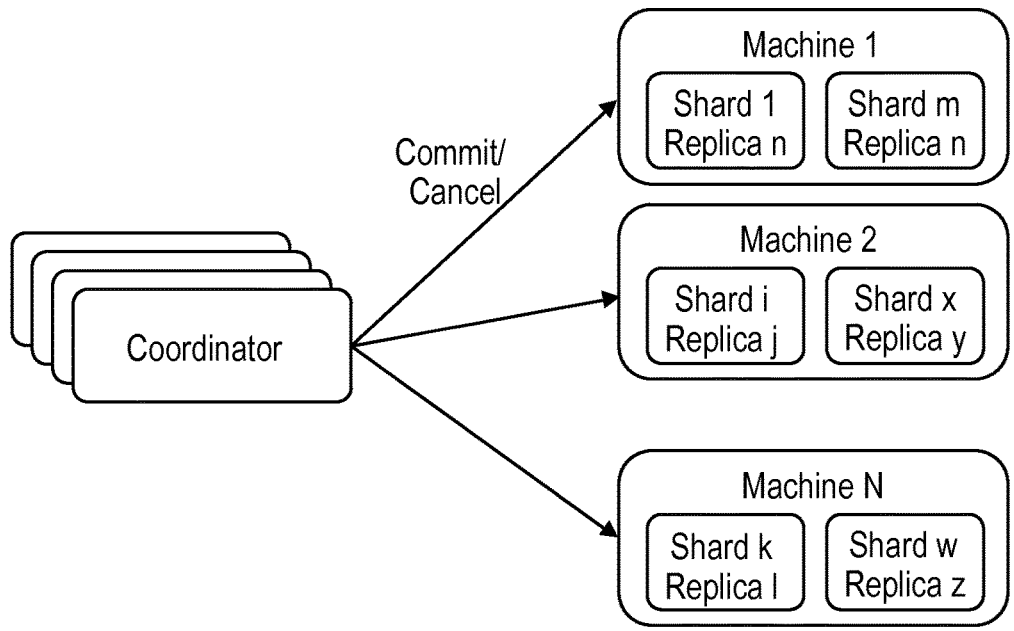
FIG. 4 is a block diagram illustrating further details of a subsequent portion of the process of FIG. 1.

Returning to FIG. 1, once the request to write data is received, each participant then prepares to commit to the transaction (Step 106), and based on whether the transaction can be carried out, each participant sends a vote back to the coordinator (Step 108). Preparation to commit a transaction entails a determination of whether or not the participant is able to fulfill the transaction, and able to do so in time. Thus, as nonlimiting examples, participants can check to determine whether they are in any failure mode that might prevent them from carrying out the transaction, or whether they are executing other processes and cannot fulfill a commitment within a predetermined time period, and vote accordingly. FIG. 3 shows the machine participants in a transaction responding to this implicit request to vote. Each machine's vote summarizes the votes for the participating shard replicas hosted on that machine. If, for example, two of the replicas hosted on the machine are involved in the transaction, the machine vote will include two votes, one for each replica belonging to a shard.

Once the coordinator has received enough votes for it to determine whether a majority of replicas in every shard have indicated whether or not to commit (Step 110 of FIG. 1), it sends the overall result of the transaction to each participant. If a majority of replicas for every shard have committed (i.e. voted yes), a commit instruction is sent to each machine (Step 112). If they receive this commit instruction in time (Step 114), consistent participants, i.e. participants that have voted yes, then write the data set to each replica in the membership set (Step 116).

Alternatively, if less than every shard has a majority of replicas that has committed, the coordinator cancels the transaction by sending a cancel instruction to each machine (Step 118). Assuming this cancel instruction is received in time (Step 120), each participant then rolls back the transaction (Step 122). The time period for receiving instructions can be any predetermined amount of time.

Figure 5:
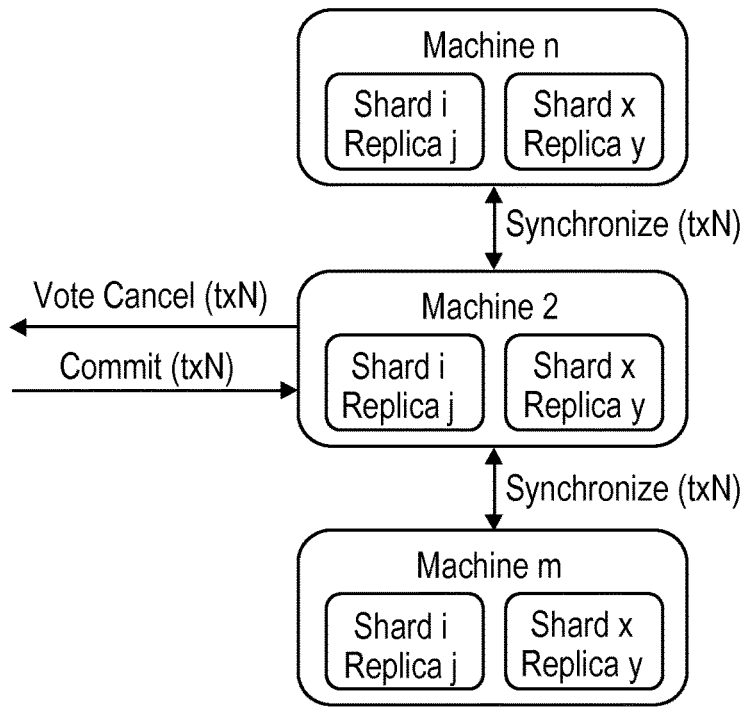
FIG. 5 is a block diagram illustrating further details of a still further portion of the process of FIG. 1.
Figure 6:
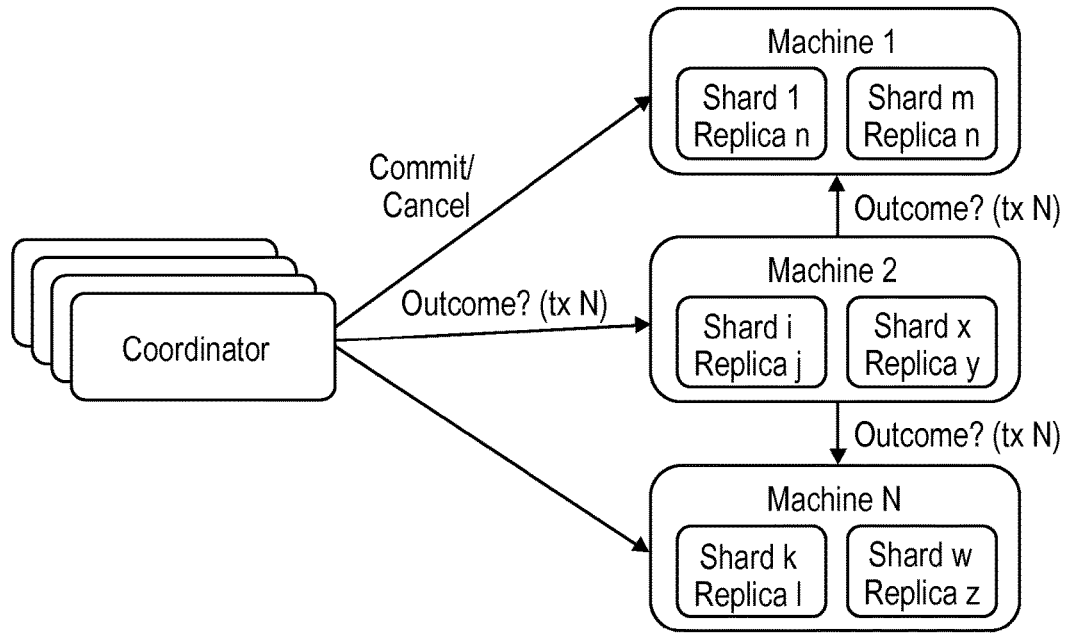
FIG. 6 is a block diagram illustrating further details of a still further portion of the process of FIG. 1.

Inconsistent participants synchronize their state with one or more of their consistent peers in the majority (Step 126). FIG. 5 shows further details of what happens when a participant disagrees with a majority outcome—when, for example, a transaction succeeds despite a minority of replicas in one or more shards having voted to cancel the transaction. When any participant disagrees in the outcome, it is deemed to be inconsistent with the majority. Accordingly, consistent participants are asked to commit via a commit instruction sent in Step 112 (where they then carry out the transaction at Step 116), and inconsistent participants subsequently commit by synchronizing themselves with one or more already-committed peers. Put another way, an inconsistent participant, here Machine 2, first transmits its Vote Cancel (tx N) signal, rendering it an inconsistent participant to the coordinator. The coordinator later decides to commit to the transaction and sends the Commit (tx N) signal to the inconsistent participant, ending the transaction messages to that participant. Subsequently, Machine 2 uses a synchronization protocol to synchronize itself with its peers via Synchronize (tx N) signals, thus making itself consistent with its peers.

Depending on factors such as network outages, machine failures and the like, it is possible that a commit instruction sent in Step 112 may not reach every participant. In this case, participants will time out before the instructions to commit or cancel reach them. This situation is shown by the "no" outcome of Steps 114 and 120 of FIG. 1. If a participant does not learn the outcome of a transaction in a timely manner (i.e. within a time period which can be any predetermined amount of time), it asks its reachable peers and any reachable coordinators for the result (Step 122). This is shown in further detail in FIG. 6. If any peer or coordinator knows the outcome, it responds, and the participant applies the result (Step 124). If a contacted peer is unaware of the transaction (e.g., because it is far behind or in an outright erroneous state), it initiates a synchronization protocol as shown in FIG. 5. Any synchronization protocol is contemplated. The synchronization protocol shown in FIG. 5 is illustrative only, and embodiments of the invention are not limited thereto.

Coordinators in certain embodiments of the invention maintain the state of individual transactions. It would be beneficial if each coordinator, therefore, is recoverable so that its transaction state is not lost. Further, it is beneficial if this transaction state is stored in a multiply redundant way—that is, with multiple coordinators—so that the failure of any one coordinator does not prevent individual transactions from progressing. Redundancy amongst coordinators can be achieved using existing and known consensus protocols such as PAXOS, thus allowing for scaling the number of participants in a transaction independently from the number of coordinators used for redundancy. By making coordinators recoverable and transaction state multiply redundant, transactions can proceed to completion in the face of failure, thereby maintaining a high degree of liveness in the overall system.

The transaction protocol enacted by each coordinator is summarized below. For a transaction tx which coordinates a consistent outcome across specific shards and their individual replicas:

A Transaction tx is considered successful iff:
$\forall s \in shards(tx)$: majority[$r \in replicas(s)$: vote($r$,tx)=commit]

A Transaction tx is considered aborted iff: $\exists s \in shards$
(tx): majority[$r \in replicas(s)$: vote($r$,tx)=abort]

A Transaction tx is considered failed if none of the above conditions are met on tx timeout.

Once a coordinator has collected enough votes to establish an outcome, it decides whether the transaction is successful or should be aborted, and transmits this outcome to each machine that hosts a participating replica. When a participant receives an outcome, it acts accordingly. If a participant doesn't receive an outcome within the timeout period, it asks the coordinator or its peers for the transaction outcome.

If the transaction outcome is commit, and the participant is in the majority, the relevant writes are applied to the data model within each participating replica on that machine, and made durable.

If the participant is in the minority—that is, it voted for a different outcome—it executes a repair or synchronization protocol. This repair protocol returns the participant to a healthy (that is, consistent with the majority) state; in a healthy state, a participant will always reach a majority decision in non-pathological cases. The repair protocol sources missing transactions from peer replicas that are known to be in a healthy state.

Figure 7:
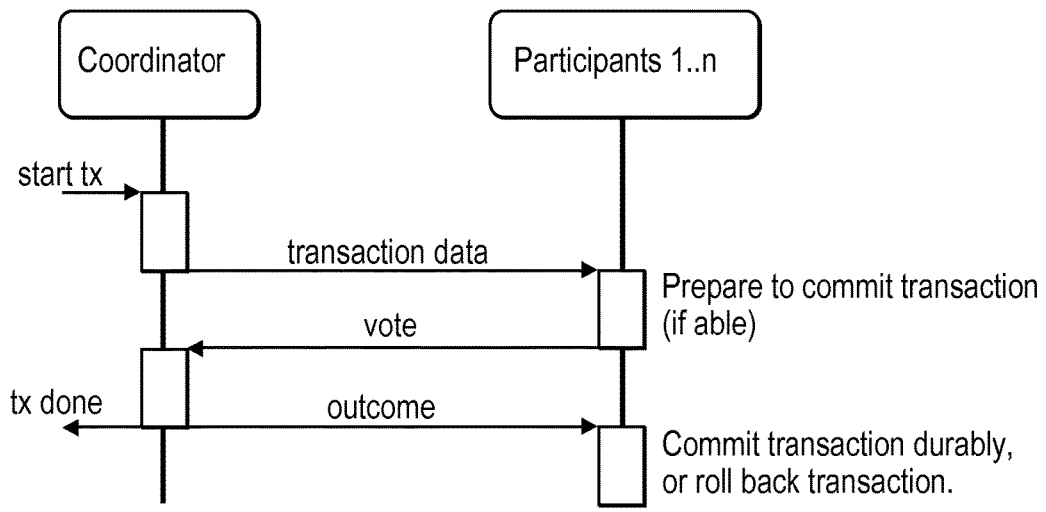
FIG. 7 is a diagram summarizing the flow of signals transmitted during execution of an embodiment of the invention.

FIG. 7 outlines the two phases of the commit protocol (prepare and commit), and the messages sent between the coordinator and the participants. In the first phase each participant prepares to commit the transaction and votes on the outcome based on its internal state. The coordinator broadcasts the outcome to each participant when it has received enough votes to determine the outcome. From the outside perspective the transaction can be considered done when the outcome has been determined, since each participant has durably recorded what to commit, and the coordinator has durably recorded the outcome. Upon learning the outcome of the transaction each participant will either commit or rollback the transaction (depending on what the outcome was).

Each round of messages includes as many messages as there are participants in the transaction: either one from the coordinator to each participant, or one from each participant to the coordinator.

Since replicas may be inconsistent from time to time (whilst allowing forward progress to be made) the above solution also allows replicas to execute the repair protocol in an ongoing manner, as they communicate amongst themselves and discover inconsistencies. This proactive ongoing repair prevents replicas from accruing significant transaction debt, which may take a significant amount of time to correct, but at the expense of their consuming more resources within the running system.

Together, these protocols ensure the database maintains a high degree of liveness, while also ensuring data is consistent across sufficient replicas for the database to provide consistent data to applications. When liveness cannot be upheld while executing a write, the protocols maintain consistency by preventing a minority of replicas from changing the state of the system.

Much of the previous research in two-phase transactions has been in open-membership, general-purpose transaction protocols. This research has not attempted to solve a specific problem using specialized protocols within a closed (but large) system.

Furthermore, the research around data consistency in very large databases has veered away from two-phase approaches because of the commonly held view that any two-phase protocol will cause blockages, high latency and poor performance in a distributed system.

However, we have found that specialized two-phase protocols executing over closed networks of participants do not suffer such drawbacks. Thus, certain embodiments are designed to work in clusters with a large number of servers, but where only a small portion of the members participate in each transaction. The number of transaction participants is unrelated to the number of servers and does not grow when the server count grows. As such, the number of participants in the protocol can be much smaller than the server count. Furthermore the connectedness of the data in the data model keeps the number of participants in each transaction small, since real world transactions typically operate on related data elements, and a partitioning approach can be employed to host strongly related data elements in the same shard.

Previously, most comparable large databases insisted on using eventually consistent techniques to maintain consistent replicas of discrete data on a cluster of databases instances. In an eventually consistent system, replicas of discrete data may be inconsistent with respect to one another at any given point in time, but they are guaranteed to become consistent over time in the absence of any further writes to the system. However, in the general case, where data is connected rather than simply stored as discrete keys and values, these read-consistent strategies are not enough to prevent replicas from diverging irreparably and corrupting data. Only by ensuring consistency at write time can such corruption be avoided.

One basis for loose two-phase consensus derives from the OASIS Business Transaction Protocol, which is an open-membership protocol for loose coordination of business interactions over the Internet. While a two-phase, coordinator-centric protocol, it allows for outcomes to be adjudicated by some external logic such that not all participants need vote commit for a transaction to be considered committed.

Embodiments of the invention differ from this protocol, however. The above-described process requires a conjunction of majorities for a successful transaction. Furthermore, the notion of open membership (transaction enrolment) has been removed. Instead, participants can be computed based on a closed membership environment, such as a database cluster. This substantially reduces the number of messages required to reach agreement, which in turn maintains minimal possible latency for writes.

Figure 8:
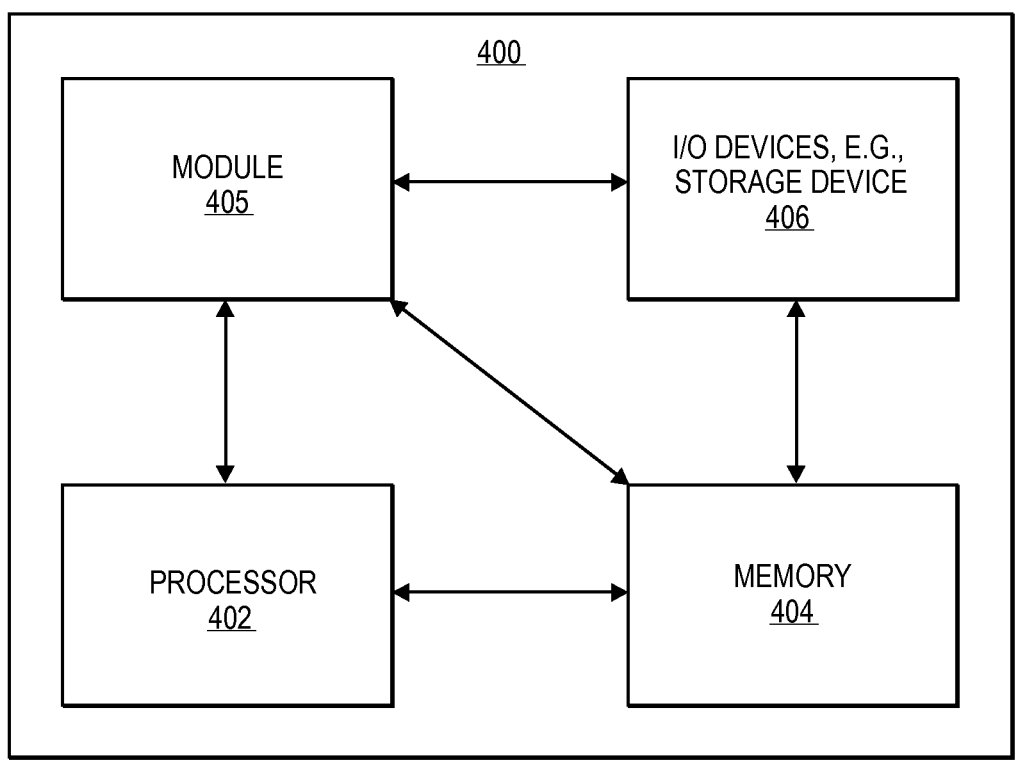
FIG. 8 is a block diagram representation of a computing device for implementing embodiments of the invention.

FIG. 8 depicts a high-level block diagram of a general-purpose computer suitable for use in performing the functions described herein. It is contemplated that a number of such computers exist and are in communication with each other via a communication medium such as the Internet. Each computer stores and implements a portion of a distributed database. As depicted in FIG. 8, the system 400 comprises a processor element 402 (e.g., a CPU), a memory 404, e.g., random access memory (RAM) and/or read only memory (ROM), a module 405 for providing network virtualization, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for providing a distributed database can be loaded into memory 404 and executed by processor 402 to implement the functions as discussed above. As such, the present method 405 for providing network virtualization (including associated data structures) of the present invention can be stored on a computer readable medium, e.g., RAM memory, magnetic or optical drive or diskette and the like. The memory 404 can also store instructions for carrying out any elements of the distributed database. For example, the memory 404 can store instructions for executing a coordinator, database program, and storing any number of shard replicas. The distributed database can employ any number of coordinators, shards and replicas, and any other database function, and any computer can store code for, and execute, any one or more of these.

The various figures show simplified examples of hardware configurations, so as not to distract from an understanding of various aspects of the invention. It will be recognized that hardware implementing aspects and embodiments of the invention can have any other structure and/or function allowing it to implement the above described methods and solutions. For example, the various network components shown may have more than one processor and more than one connection to various networks. Additionally, the various software modules can exist as discrete modules as shown, or can exist as parts of a larger set of code of any kind.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the processes of embodiments of the invention can be carried out by any number of virtual machines and for any number of shards and their replicas, regardless of which such machines on which those replicas are located. Also, the various embodiments each have certain features that differ from those of other embodiments, and it is noted that the invention contemplates the mixing and matching of various features as desired. That is, further embodiments can be formed from the selection of various features from different embodiments. The embodiments were chosen and described in order to best explain the principles of the invention and its practical applications, to thereby enable others skilled in the art to best utilize the invention and various embodiments with various modifications as are suited to the particular use contemplated. The various features of the disclosed embodiments may be mixed and matched in any manner or combination to form further embodiments contemplated by the invention.

What is claimed is:

1. A method of updating a database, comprising: receiving data to be written to a database;
   identifying a set of shard replicas corresponding to the database to which the data is to be written;
   transmitting, to each of the replicas in the set, a request to write the data thereto; receiving votes back from the replicas in the set, each vote representing whether the respective replica commits to a writing of the data thereto;
   determining whether to commit to the writing of the data to the database according to whether, for each shard having replicas in the set, a majority but less than all of the replicas of the each shard which also belong to the set has transmitted a vote committing to the writing of the data thereto;
   if at least one of the shards having replica in the set fails to achieve the majority but less than all of the replica, not committing the writing; and
   transmitting an outcome of the determining to each of the replicas in the set.

2. The method of claim 1, wherein the transmitting an outcome further comprises transmitting a commit instruction to each of the replicas in the set upon receiving the vote committing to the writing of the data from, for each shard having replicas in the set, a majority of the replicas of that shard which also belong to the set.

3. The method of claim 1, wherein the transmitting an outcome further comprises transmitting a cancel instruction to each of the replicas in the set upon receiving votes committing to the writing of the data from less than half of the replicas of a shard having replicas in the set after a predetermined time period.

4. The method of claim 1, wherein the transmitting, to each of the replicas in the set, a request to write the data thereto further comprises transmitting at least a portion of the data that is to be written.

5. A method of updating a database, comprising
   transmitting a request to execute a database transaction, the request transmitted to a set of database members, the set being a set of shard replicas;
   receiving responses from the members of the set, each response representing whether the corresponding member commits to the transaction;
   committing to the transaction if, for each shard having replicas in the set, a majority but less than all of its respective replicas of the set of shard replicas has committed to the transaction; and
   if at least one of the shards having replica in the set fails to achieve the majority but less than all of the replica, not committing the writing.

6. The method of claim 5, further comprising cancelling the transaction if, for at least one shard having replicas in the set, only a minority of its respective replicas has transmitted a response representing commitment to the transaction after a predetermined time period.

7. The method of claim 5, wherein the transmitting a request further comprises transmitting data to be written to the database in the transaction.

8. One or more non-transitory computer-readable media, the memories collectively storing instructions for executing a method of updating a database, the method comprising:
   receiving data to be written to a database;
   identifying a set of shard replicas corresponding to the database to which the data is to be written;
   transmitting, to each of the replicas in the set, a request to write the data thereto; receiving votes back from the replicas in the set, each vote representing whether the respective shard or replica commits to a writing of the data thereto;
   determining whether to commit to the writing of the data to the database according to whether, for each shard having replicas in the set, a majority but less than all of the replicas of the each shard which also belong to the set has transmitted a vote committing to the writing of the data thereto;
   if at least one of the shards having replica in the set fails to achieve the majority but less than all of the replica, not committing the writing; and
   transmitting an outcome of the determining to each of the replicas in the set.

9. The one or more non-transitory computer-readable media of claim 8, wherein the transmitting an outcome further comprises transmitting a commit instruction to each of the replicas in the set upon receiving the vote committing to the writing of the data from, for each shard having replicas in the set, a majority of the replicas of that shard which also belong to the set.

10. The one or more non-transitory computer-readable media of claim 8, wherein the transmitting an outcome further comprises transmitting a cancel instruction to each of the replicas in the set upon receiving votes committing to the writing of the data from less than half of the replicas of a shard having replicas in the set after a predetermined time period.

11. The one or more non-transitory computer-readable media of claim 8, wherein the transmitting, to each of the shards and the replicas in the set, a request to write the data thereto further comprises transmitting at least a portion of the data that is to be written.

12. One or more non-transitory computer-readable media, the memories collectively storing instructions for executing a method of updating a database, the method comprising:
   transmitting a request to execute a database transaction, the request transmitted to a set of database members, the set being a set of shard replicas;
   receiving responses from the members of the set, each response representing whether the corresponding member commits to the transaction;
   committing to the transaction if, for each shard having replicas in the set, a majority but less than all of its respective replicas of the set of shard replicas has committed to the transaction; and
   if at least one of the shards having replica in the set fails to achieve the majority but less than all of the replica, not committing the writing.

13. The one or more non-transitory computer-readable media of claim 12, further comprising cancelling the transaction if, for at least one shard having replicas in the set, only a minority of its respective replicas has transmitted a response representing commitment to the transaction after a predetermined time period.

14. The one or more non-transitory computer-readable media of claim 12, wherein the transmitting a request further comprises transmitting data to be written to the database in the transaction.

* * * * *